United States Patent [19]

Mizuno et al.

[11] Patent Number: 5,378,389
[45] Date of Patent: Jan. 3, 1995

[54] WET PAINT SPRAY BOOTH TREATING AGENT AND METHOD FOR THE TREATMENT THEREWITH

[75] Inventors: Keisuke Mizuno; Masahiro Horiuchi, both of Tokyo, Japan

[73] Assignee: Kurita Water Industries Ltd., Tokyo, Japan

[21] Appl. No.: 91,727

[22] Filed: Jul. 15, 1993

Related U.S. Application Data

[63] Continuation of Ser. No. 768,536, filed as PCT/JP90/01320, Oct. 12, 1990, published as WO91/12311, Aug. 22, 1991, abandoned.

[30] Foreign Application Priority Data

Feb. 16, 1990 [JP] Japan ................... 2-35338

[51] Int. Cl.$^6$ ................................. C02F 1/56
[52] U.S. Cl. ..................... 252/180; 210/735; 210/930; 210/712; 252/175; 252/DIG. 8
[58] Field of Search ......... 252/180, 181, 175, DIG. 8; 210/712, 728, 735, 930

[56] References Cited

U.S. PATENT DOCUMENTS

| | | | |
|---|---|---|---|
| 3,515,575 | 6/1970 | Arnold | 210/430 |
| 3,723,148 | 3/1973 | Tupper et al. | 210/930 |
| 3,728,148 | 3/1973 | Tupper | 106/287.23 |
| 3,985,922 | 10/1976 | Thornton et al. | 427/345 |
| 4,130,674 | 12/1978 | Roberts et al. | 210/930 |
| 4,185,970 | 1/1980 | Dean | 210/930 |
| 4,440,647 | 4/1984 | Puchalski | 252/181 |
| 4,656,059 | 4/1987 | Mizuno et al. | 210/729 |
| 4,792,364 | 12/1988 | Huang | 252/175 |
| 4,935,149 | 6/1990 | Morse | 210/712 |
| 5,024,768 | 6/1991 | Merrell | 252/180 |
| 5,073,205 | 2/1991 | Morse | 134/38 |
| 5,147,557 | 9/1992 | Purnell | 210/712 |
| 5,192,449 | 3/1993 | Huang et al. | 210/712 |
| 5,250,190 | 10/1993 | Kassouf et al. | 210/712 |

FOREIGN PATENT DOCUMENTS 293129  11/1988  European Pat. Off. .

OTHER PUBLICATIONS

Melamine—Formaldehyde Paint Detackifying various Abstracts of Foreign & U.S. patents.

*Primary Examiner*—Jacqueline V. Howard
*Assistant Examiner*—James M. Silbermann
*Attorney, Agent, or Firm*—Kanesaka & Takeuchi

[57] ABSTRACT

A wet paint spray booth treating agent comprising a melamine—aldehyde acid colloid solution, a nitrogen atom-containing organic compound and an anionic water soluble high molecular weight dispersant. A method for the treatment of a wet paint spray booth which comprises adding a melamine—aldehyde acid colloid solution, a nitrogen atom-containing organic compound and an anionic water soluble high molecular weight dispersant to a recirculating washing water in a wet paint spray booth.

12 Claims, 1 Drawing Sheet

WET PAINT SPRAY BOOTH TREATING AGENT AND METHOD FOR THE TREATMENT THEREWITH

This application is a continuation of application Ser. No. 07/768,536, filed as PCT/JP90/01320, Oct. 12, 1990, published as WO91/12311, Aug. 22, 1991, now abandoned.

TECHNICAL FIELD

This invention relates to a wet paint spray booth treating agent and to a method for the treatment of a wet paint spray booth, and more particularly, relates to a wet paint spray booth treating agent for diminishing the tackiness of paint in a recirculating washing water to be sprayed for collecting surplus paint and preventing the paint from adhering and fixing to the interior of the system in the wet paint spray booth, and to a method for the treatment of a wet paint spray booth.

BACKGROUND ART

In the coating process of the automotive industry, the yield of the paint sprayed to an automobile body is generally from 60 to 80% and 40 to 20% of the used paint constitutes a surplus paint to be removed in the subsequent process. For the collection of the surplus paint sprayed excessively, treatment is usually applied in a wet spray booth by water washing and the washing water is circulated for re-use.

In the wet paint spray booth constructed as described above, since the surplus paint which is collected in the washing water has high tackiness, it adheres to the water-film panel, the piping system, the spray nozzle, etc. of the spray booth, clogs the piping system and the nozzle, and seriously degrades the efficiency of water washing. Further, when clogging by the deposition of the surplus paint occurs in a gas discharge system of the spray booth, and the flow of air is inhibited, the solvent of the paint fills up the interior of the booth to produce a state dangerous to safety and hygiene and seriously degrade the working environment. Moreover, the greater part of the surplus paint settles to the bottom of the booth pit and the bottom of the circulation pit in the spray booth and the sedimented paint hardens into a rubbery state with elapse of time to take much time and labor for the cleaning and removal.

For the solution of these problems, paint spray booth treating agents to be added to the washing water have hitherto been developed, and methods of adding chemicals such as:

(1) alkalis such as NaOH and KOH,
 (2) amphoteric metals such as Zn salts,
 (3) cationic polymers, and
 (4) surface active agents to the washing water, alone or in a combined use of two or more of them have been known. In addition, there has been proposed (5) a method of using melamine—aldehyde acid colloid (Japanese Patent Publication Sho 63-33799, corresponding to U.S. Pat. No. 4,656,059).

Among the conventional treating agents mentioned above, (1) to (4) entail the disadvantages, for example, (a) the effects are not sufficient,
 (b) the applicable pH ranges is narrow, stable treatment is difficult, and it requires a great amount of pH adjusting agents,
 (c) the kind of paints applicable is limited and the effect is low for acrylic paints and phthalic acid type paints,
 (d) COD in the circulating water is increased due to liberation of treating agents, and
 (e) the amount of the paint sludge is increased in the case of using the metal salt, and they can not considered advantageous from an industrial point off view.

Further, any of (1)–(5) involves the following drawbacks when used alone.

(f) In a case where paint load is great, sufficient reduction of tackiness may sometimes be impossible, and
 (g) effect for the reduction of tackiness is scarcely obtained for a raw paint.

The paint load means the charging rate or flow velocity of a surplus paint to be treated (over sprayed paint) and it is usually about 100 ppm based on the amount of circulating water (amount of paint/amount of circulating water) and about 200 ppm at the greatest, which is different depending on the types of the paint used. Due to the introduction of manipulators and increase in the number of products in recent years, the amount of the surplus paint tends to be far increased relative to the capacity of the facility, which increases the paint load. Further, the raw paint requires treatment, for example, upon color-change (change from a certain color to another color). That is, upon color-change, since the remained paint in the piping system from the paint reservoir to the spray gun is often discarded without spraying in to the washing water, its treatment becomes necessary. While the raw paint is recovered depending on the case but the complete recovery is difficult and, even in the case of recovery, at least a portion thereof has to be treated.

Further, Japanese Patent Laid-Open Sho 63-260970 discloses an invention of adding, for example, glutamic acid to a booth circulating water. Further, Japanese Patent Laid-Open Sho 62-298478 describes an invention of adding, for example, a maleic acid series polymer but satisfactory effects can be obtained by none one of such methods.

DISCLOSURE THE INVENTION

A wet paint spray booth treating agent according to the present invention has a feature of containing a melamine—aldehyde acid colloid solution, a nitrogen atom-containing organic compound and an anionic water soluble high molecular weight dispersant.

A method for the treatment of a wet paint spray booth according to the present invention has a feature of adding a melamine—aldehyde acid colloid solution, a nitrogen atom-containing organic compound and an anionic water soluble high molecular weight dispersant to a recirculating washing water in a wet paint spray booth.

Since the hydrophobic property of paint particles such as of an acrylic type resin is much more strong as compared with that of the melamine—aldehyde acid colloid solution, the melamine—aldehyde acid colloid solution alone shows poor absorption property and reduction off tackiness is somewhat insufficient. In particular, in a case of a great paint load in which the surplus paint enters the system at a high velocity, the absorption rate of the melamine—aldehyde acid colloid solution to the paint can not catch up with the charging velocity of the surplus paint; which makes the reduction of tackiness insufficient.

In such a case, the anionic water soluble high molecular weight dispersant such as of maleic acid type polymers can compensate the absorption of the melamine—aldehyde acid colloid solution to the surplus paint. That is, since the anionic water soluble high molecular weight dispersant has hydrophobic groups, it can easily be adsorbed on the paint that has also the hydrophobic property. The hydrophobic groups of the high molecular weight dispersant are adsorbed on the surface of the paint particles, while the hydrophilic groups (—COO—) thereof are oriented outward of the particles, which increases the hydrophilic property of the paint particles to enhance the reduction of tackiness of the paint and improve the adsorption property of the melamine—aldehyde acid colloid solution to the paint particles. In this case, only with the layer which is made by the coverage of the high molecular weight dispersant, the degree of the reduction of tackiness is insufficient because this layer is weak and a layer of melamine aldehyde colloid solution is necessary.

By the way, since the hydrophilic property of the hydrophilic groups of the high molecular weight dispersant is extremely strong, molecules of water may be arranged at the periphery thereof, depending on the case, to hinder the melamine aldehyde acid colloid solution from approaching the paint particles. In this case, since the nitrogen-containing groups (such as $NH_2$- groups) of the nitrogen atom-containing organic compound has a strong reactivity with the hydrophilic groups of the high molecular weight dispersant, they are adsorbed while excluding the molecules of water to facilitate the adsorption between the melamine aldehyde acid colloid solution and the paint particles (or the layer of the high molecular weight dispersant).

As described above in a system where the melamine—aldehyde colloid solution, the high molecular weight dispersant and the nitrogen atom-containing organic compound are present together, adsorption between the melamine—aldehyde acid colloid solution and the paint particles (or the layer of the high molecular weight dispersant at the surface thereof) is facilitated to make the reduction of tackiness of the paint more completely.

The high molecular weight dispersant also provides an effect of promoting the reduction of tackiness by preventing the paint particles from coagulating into a mass due to its dispersing power.

BEST MODE FOR PRACTICING THE INVENTION

Figure 1:
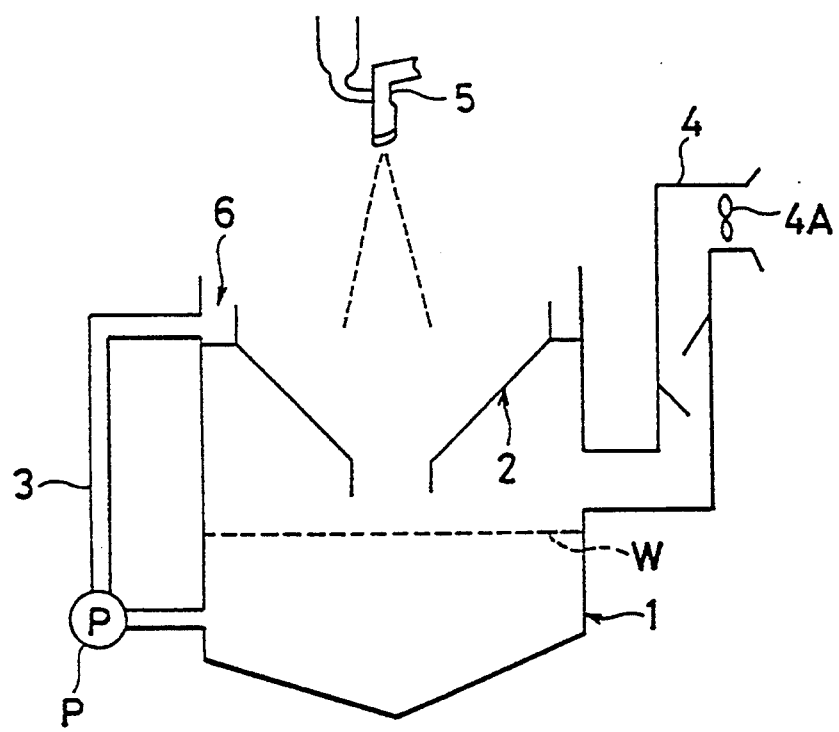
FIG. 1 is a schematic cross sectional view illustrating a test device used in an example.

The present invention will now be described specifically hereinafter.

Melamine—aldehyde acid colloid solution according to the present invention can be produced, for example, by causing melamine to react with 1 to 6 mols of aldehyde based on one mol of melamine to obtain methylol melamine and further adding a monobasic acid to the thus obtained methylol melamine. Further, those prepared by further alkyl-esterifying methylol melamine with a lower alcohol and adding thereto a monobasic acid can also be used.

That is, methylol melamine or alkyl-etherified methylol melamine according to the present invention is represented by the following structural formula, and the acid colloid solution comprises the compound wherein about 1–10 units thereof condensated together.

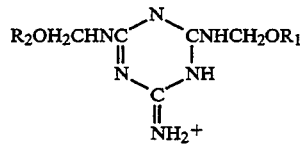

where $R_1$ and $R_2$ may be identical or different with each other and represent respectively hydrogen or lower alkyl group with 1 to 4 carbon atoms.

As the aldehyde, there can be mentioned, for example, formaldehyde, paraformaldehyde, acetaldehyde and propion aldehyde, among them, formaldehyde and paraformaldehyde being particularly preferred from tile view point of handling and efficiency of reaction.

The ratio of melamine and aldehyde to be charged is from 1 to 6 mol of aldehyde per 1 mol of melamine. When aldehyde exceeds 2.5 mol, the amount of free aldehyde is increased in the produced acid colloid solution. Since the free aldehyde forms a source for COD, the amount of aldehyde is preferably less than 2.5 mols where COD causes a problem.

The methylol melamine obtained as described above does not dissolve in water but dissolves in a colloidal state in an acid solution. On the other hand, the alkyl-etherified methylol melamine which is obtained by further alkyl-esterifying methylol melamine is water soluble and causes etheric decomposition to form methylol melamine also into a colloidal state upon addition of the acid.

As the acid to be used, monobasic acid can be mentioned. As the monobasic acid, there can be mentioned mineral acids such as hydrochloric acid and nitric acid, as well as organic acids such as formic acid, acetic acid, lactic acid and propionic acid. Among them, hydrochloric acid is preferred since it can form a stable colloid solution.

The amount of the monobasic acid, particularly, hydrochloric acid to be added is advantageously about from 0.5 to 1.5 mols, preferably, from 0.7 to 1.3 mols based on one mol of melamine.

If the amount of the acid added is less than 0.5 mol, it becomes difficult to provide a sufficient acid colloidality. On the other hand, if it exceeds 1.5 mols, the stability of the colloid solution tends to be worsened.

During the initial stage of preparing the methylol melamine acid colloid solution, the colloid solution contains free aldehyde in a large amount, but the free aldehyde is decreased when the solution is left standing and aging at a room temperature after preparation. The aging can be accelerated also by heating. The time for the aging is, appropriately, from 5 days to three months in a case of aging at a room temperature and about from 2 to 3 hours in a case of aging under heating at 50° C.

As the nitrogen atom-containing organic compound, compounds containing amino group or alkyl substituent thereof, specifically, the following I-III can be mentioned:

I: amino acid such as glycine, glutamic acid and aspartic acid or the salts thereof, amino acid derivatives such as betaine or gelatin, II: amines such as dimethylaminoethanol, monoethanol amine, diethanolamine, triethanolamine and aminomethyl propanol, III: ethylenediaminetetraacetic acid (EDTA), nitrilotriacetic acid (NTA) and salts thereof.

As the anionic water soluble molecular weight dispersant, those having a molecular weight ranging from 300 to 500,000 and, in particular, from 500 to 500,000 are preferred, which may be either water soluble type or emulsion type and, more specifically, the compounds referred to as (a)and(b) below can be mentioned:

(a) homopolymer, copolymer, terpolymer containing carboxylic acid monomers such as acrylic acid, methacrylic acid and maleic acid, or salts of such polymers.

(b) homopolymer, copolymer, terpolymer containing partially hydrolyzed acrylamide monomer, or salts of such polymers.

The reason why relatively low molecular weight water soluble high molecular weight polymer having a molecular weight of greater than 300 and smaller than 500,000 are preferred as the anionic water soluble high molecular weight dispersant is that the effect of reducing the tackiness of a paint can be provided by the water soluble high molecular weight polymer having the molecular weight of greater than 300, whereas such effect for the reduction of tackiness can not be obtained sufficiently with a water soluble high molecular weight polymer having the molecular weight of less than 300. On the other hand, the water soluble high molecular weight polymer having the molecular weight in excess of 500,000 increases the effect of coagulating the paint particles and increases the tackiness of the high molecular polymer per se and, accordingly, they are not appropriate.

For the maleic acid type polymers, those having the molecular weight in excess of 500 and less than 1000 are particularly preferred.

The wet paint spray booth treating agent of the present invention is desired to contain the above-mentioned three ingredients at a ratio, as the pure component, of:

Melamine—aldehyde acid colloid solution=40 to 99.8 wt %

Nitrogen atom-containing organic compound=0.1 to 30 wt %.

Anionic water soluble high molecular weight dispersant=0.1 to 80 wt %.

The wet paint spray booth treating agent of the present invention may also incorporate other chemicals in addition to the above-mentioned three ingredients. Further, it may be used in combination with other chemicals. Preferred chemicals and their functions and effects are as follows.

(i) Alkali agent: effective in forming a solution of the amino acid, carboxylic acid or the like and in pH adjustment and corrosion protection for the facility.

(ii) High molecular weight flocculant, inorganic flocculant:
effective in coagulation of sludges and solid-liquid separation.

(iii) Tackiness-reducing agent such as amphoteric metal, surface active agent: effective in further improvement of the reduction of tackiness of the paint.

The method for the treatment of a wet paint spray booth according to the present invention resides in applying a treatment by using the wet paint spray booth treating agent of the present invention as described above, which comprises injecting and adding an appropriate amount of the treating agent of the present invention into the recirculating washing water of the wet paint spray booth, thereby obliterating tackiness of the surplus paint collected in the water or raw paint.

In this case, the addition amount of the wet paint spray booth treating agent according to the present invention is properly determined such that the amount of the melamine—aldehyde acid colloid solution, the effective ingredient of which is assumed as 10% by weight, is greater than 0.1 ppm and, usually, about 1 to 1000 ppm based on the washing water and greater than 0.1% by weight, and usually, about 1 to 100% by weight based on the amount of the surplus paint in the washing water, such that the amount of the nitrogen atom-containing organic compound is greater than 0.001 ppm and, usually, about from 0.01 to 20 ppm based on the washing water and greater than 0.001% by weight and, preferably, from 0.01 to 5% by weight based on the amount of the surplus paint in the washing water and further such that the amount of the anionic water soluble high molecular weight dispersant is greater than 0.001 ppm and, usually, about from 0.01 to 20 ppm based on the washing water and greater than 0.001% by weight and, usually, about from 0.01 to 5% by weight based on the amount of the surplus paint.

There is no particular restriction on the injection method, and each of the three ingredients may be injected continuously or intermittently into the recirculating washing water each at same or different injection positions. Further, each of the ingredients may be either in a powdery or liquid form and one liquid may have a form of one or more components. That is, in the wet paint spray booth treating agent according to the present invention, the nitrogen atom-containing organic compound and the anionic water soluble high molecular dispersant usually have compatibility but the melamine—aldehyde acid colloid solution is not soluble to them.

Accordingly, only the melamine—aldehyde acid colloid solution may be injected individually.

Further, in the present invention, each of the melamine—aldehyde acid colloid solution, the nitrogen atom-containing organic compound and the anionic water soluble high molecular weight dispersant may be used alone or as a combination of two or more of species.

The present invention will now be described more specifically referring to examples and comparative examples but the present invention is not restricted to the following examples unless it does not exceed the gist thereof.

EXAMPLES 1-18

Comparative Examples 1-21

Using the test device shown in FIG. 1, effects for each kinds of chemicals were tested.

In FIG. 1, 1 is a pit, 2 is a water film plate, 3 is a circulating water pipe line having a circulating water pump P, 4 is an exhaust cylinder having an exhaust blower 4A and W is a water level. 5 is a spray gun disposed above the water film plate 2 for blowing the paint. 6 is a chemical adding section.

A test was conducted by using a testing device having a washing water capacity of 50 liter and at an amount of circulating water of 50 liter/min. As the washing water, those incorporated with chemicals shown in Table 1 by the addition amounts shown in Table 1 (based on the paint) and adjusted to pH to 7-10 were used (chemicals not added in Comparative Example 1). In Table 1, the high molecular weight dispersant polymers A-F used are as follows.

| High molecular weight dispersant | |
| --- | --- |
| Polymer A: | Maleic acid polymer<br>average molecular weight = 1000 |
| Polymer B: | Maleic acid - isopentene copolymer<br>average molecular weight = 4000 |
| Polymer C: | Isobutylene - maleic acid copolymer<br>average molecular weight = 9000 |
| Polymer D: | $$-\!\!\left(\!CH_2\!-\!\underset{\underset{C_4H_9}{\overset{|}{CH_2}}}{\overset{\overset{CH_3}{|}}{C}}\!-\!\underset{CH_3}{\overset{|}{CH}}\!-\!\underset{COONa}{\overset{|}{CH}}\!\right)_{\overline{n}}$$<br>average molecular weight = 9000 |
| Polymer E: | Hydroxyethyl acrylate - methacrylic acid -<br>methyl acrylate copolymer<br>average molecular weight = 3000 |
| Polymer F: | Sodium polyacrylate<br>average molecular weight = 6000 |

Further, as the melamine—aldehyde acid colloid solutions, the followings were used.

Melamine—Aldehyde Acid Colloid Solution

Prepared by adding 0.05 mol of methylol melamine obtained by reacting 2 mol of formaldehyde to 1 mol of melamine, to 100 ml of an aqueous 1.35% hydrochloric acid solution. It is hereinafter abbreviated as "M/F".

A test was conducted by blowing 50 cc of a white acrylic type resin paint ("#65-1205", manufactured by Rock Paint Co.) at a velocity shown in Table 1 from a spray gun 5 and, subsequently, by observing the blown paint and washing water (circulating water) or the appearance of pit, pipeline or the like. Based on the results of the observation, tackiness was evaluated depending on the amount of the paint deposited to the inner wall of the pit or the pipe line, in accordance with the following standards. The results are shown in Table 1.

Evaluation Standards x—Identical with the state of deposition in a case without treatment (blank)

△—deposition amount slightly reduced than in a case without treatment (blank)

○—deposited scarcely

⊚—not deposited at all

EXAMPLES 19–21

Comparative Examples 22–25

In the testing device shown in FIG. 1, the same 20 cc of the paint as used in Example 1 was dropped over the water film plate 2 for about 5 sec. Subsequently, washing water incorporated with the chemicals shown in Table 2 at the addition amounts (based on the paint) shown in Table 2 was kept to be circulated for 30 sec. Thereafter, circulation was interrupted and the tackiness and the appearance were examined in the same manner as in Example 1.

The results are shown in Table-2.

TABLE 1

| Example | Blowing velocity (cc/min) | Chemicals | Addition amount (wt %) | Tackiness | appearance |
| --- | --- | --- | --- | --- | --- |
| Example | | | | | |
| 1 | 30 | M/F<br>Polymer A<br>Sodium glutamate | 20<br>0.2<br>0.02 | ~△ | Particle<br>floated |
| 2 | 30 | M/F<br>Polymer A<br>Sodium glutamate | 20<br>0.2<br>0.1 | | Particle<br>floated |
| 3 | 30 | M/F<br>Polymer A<br>Sodium glutamate | 20<br>0.2<br>0.2 | ⊚~ | Particle<br>floated |
| 4 | 30 | M/F<br>Polymer A<br>Sodium glutamate | 20<br>0.2<br>1 | ⊚~ | Particle<br>floated |
| 5 | 30 | M/F<br>Polymer A<br>Sodium glutamate | 20<br>0.01<br>0.2 | ~△ | Particle<br>floated |
| 6 | 30 | M/F<br>Polymer A<br>Sodium glutamate | 20<br>0.1<br>0.2 | | Particle<br>floated |
| 7 | 30 | M/F<br>Polymer A<br>Sodium glutamate | 20<br>1<br>0.2 | ⊚~ | Fine<br>particles<br>floated |
| 8 | 30 | M/F<br>Polymber B<br>Sodium glutamate | 20<br>0.2<br>0.2 | | Fine<br>particles<br>floated |
| 9 | 30 | M/F<br>Polymer C<br>Sodium glutamate | 20<br>0.2<br>0.2 | | Fine<br>particles<br>floated |
| 10 | 30 | M/F<br>Polymer D<br>Sodium glutamate | 20<br>0.2<br>0.2 | | Fine<br>particles<br>floated |
| 11 | 30 | M/F<br>Polymer E<br>sodium glutamate | 20<br>0.2<br>0.2 | | Particles<br>floated |
| 12 | 30 | M/F<br>Polymer F<br>Sodium glutamate | 20<br>0.2<br>0.2 | | Particles<br>floated |
| 13 | 30 | M/F<br>Polymer A<br>DL-serine | 20<br>0.2<br>0.2 | ⊚~ | Fine-<br>particles<br>floated |
| 14 | 30 | M/F<br>Polymer A<br>Sodium aspartate | 20<br>0.2<br>0.2 | ⊚ | Fine<br>particles<br>floated |

TABLE 1-continued

| Example | Blowing velocity (cc/min) | Chemicals | Addition amount (wt %) | Tackiness | appearance |
|---|---|---|---|---|---|
| 15 | 30 | M/F | 20 | ⊙~ | Fine particles floated |
|  |  | Polymer A | 0.2 |  |  |
|  |  | Betain | 0.2 |  |  |
| 16 | 30 | M/F | 20 | ⊙~ | Fine particles floated |
|  |  | Polymer A | 0.2 |  |  |
|  |  | Triethanolamine | 0.2 |  |  |
| 17 | 30 | M/F | 20 | ⊙~ | Fine particles floated |
|  |  | Polymer A | 0.2 |  |  |
|  |  | Diethanolamine | 0.2 |  |  |
| 18 | 30 | M/F | 20 | ⊙~ | Fine particles floated |
|  |  | Polymer A | 0.2 |  |  |
|  |  | E D T A | 0.2 |  |  |
| Comparative Example |  |  |  |  |  |
| 1 | 5 | Blank | 0 | X | Deposited to inner wall |
| 2 | 5 | M/F | 20 | ⊙ | Fine particles floated |
| 3 | 10 | M/F | 20 |  | particles floated |
| 4 | 20 | M/F | 20 | Δ | Mass floated |
| 5 | 30 | M/F | 20 | X | Mass floated, partially deposited to inner wall |
| 6 | 10 | M/F | 20 | ⊙ | Fine particles floated |
|  |  | Polymer A | 0.2 |  |  |
| 7 | 20 | M/F | 20 | ~Δ | Particles floated, partially mass floated |
|  |  | Polymer A | 0.2 |  |  |
| 8 | 30 | M/F | 20 | Δ | Particles floated but coagulated with time |
|  |  | Polymer A | 0.2 |  |  |
| 9 | 10 | M/F | 20 |  | Particles and mass floated |
|  |  | Sodium glutamate | 0.2 |  |  |
| 10 | 20 | M/F | 20 | ~Δ | Mass floated |
|  |  | Sodium glutamate | 0.2 |  |  |
| 11 | 30 | M/F | 20 | Δ~X | Mass floated |
|  |  | sodium glutamate | 0.2 |  |  |
| 12 | 10 | Sodium glutamate | 0.2 | X | Mass floated |
| 13 | 10 | Sodium glutamate | 1.0 | X | Mass floated |
| 14 | 10 | Diethanolamine | 0.2 | X | Mass floated |
| 15 | 10 | Diethanolamine | 1.0 | X | Mass floated |
| 16 | 10 | Polymer A | 0.2 | X | Mass floated |
| 17 | 10 | Polymer A | 1.0 | Δ | Mass floated |
| 18 | 10 | Sodium glutamate | 0.2 | Δ | Mass floated |
|  |  | Polymer A | 0.2 |  |  |
| 19 | 10 | Sodium Glutamate | 1.0 | Δ | Mass floated |
|  |  | Polymer A | 1.0 |  |  |
| 20 | 10 | Diethanolamine | 0.2 | Δ | Mass floated |
|  |  | Polymer A | 0.2 |  |  |
| 21 | 10 | Diethanolamine | 1.0 | Δ | Mass floated |
|  |  | Polymer A | 1.0 |  |  |

TABLE 2

| Example | Chemicals | Addition amount (wt %) | Tackiness | Appearance |
|---|---|---|---|---|
| Example |  |  |  |  |
| 19 | M/F | 20 | Δ | Particles and mass floated |
|  | Polymer A | 0.2 |  |  |
|  | Sodium glutamate | 0.2 |  |  |
| 20 | M/F | 40 | ~Δ | Particles floated |
|  | Polymer A | 0.4 |  |  |
|  | Sodium glutamate | 0.4 |  |  |

TABLE 2-continued

| Example | Chemicals | Addition amount (wt %) | Tackiness | Appearance |
|---|---|---|---|---|
| 21 | M/F | 80 | | Particles floated |
| | Polymer A | 0.8 | | |
| | Sodium glutamate | 0.8 | | |
| Comparative example | | | | |
| 22 | M/F | 80 | X | Particles and mass floated |
| 23 | M/F | 80 | X | Particles floated but coagulated with time |
| | Polymer A | 0.6 | | |
| 24 | M/F | 80 | X | Particles floated |
| | Sodium glutamate | 0.6 | | |
| 25 | Polymer A | 0.8 | X | Particles floated |
| | Sodium glutamate | 0.8 | | |

As apparent from the foregoing results, the wet paint spray booth treating agent according to the present invention can remarkably diminish the deposition, adhering and coagulation of the paint in the system of the wet booth even in a case where the amount of the surplus paint is great. Furthermore, the treating agent according to the present invention is extremely effective also to the raw paint.

Industrial Applicability

By the wet paint spray booth treating agent and the method for the treatment of the wet paint spray booth according to the present invention, It is possible to effectively reduce the tackiness of the surplus paint, and make the paint easily removable in the flowable particle state. Furthermore, it is effective substantially to all kinds of paints, and has a high effect of reducing tackiness also to the acrylic or phthalic acid type paints, as well as to high-solid type paints which are considered difficult to reduce their tackiness. In addition, even when a load is great or a raw paint is discharged, the agent according to the present invention can also reduce the tackiness. By the way, by the treating agent and the treating method according to the present invention, treatment is possible up to about 600 ppm of the blowing amount of the paint based on the amount of the recirculating washing water.

Therefore, by the treating agent and the treating method according to the present invention, (1) clogging in the nozzle due to the deposition of the paint to the piping system or the like can be prevented to maintain the water washing efficiency at a satisfactory level and facilitate the maintenance.

(2) Deterioration of the working environment by the clogging in the gas discharge system or the like can be prevented.

(3) The paint sludge which deposits or floats in the booth pit or the like is not easily solidified and can be removed readily.

Accordingly, the removing operation can be facilitated.

(4) Cleaning liquid waste can easily be put to solid-liquid separation and the waste water can be treated easily.

(5) Solids in washing water after use can be separated and removed at a high separating efficiency to maintain the clarity of the circulating washing water at high level.

Then, treatment for the paint booth can be conducted with an extreme industrial advantage.

We claim:

1. A wet spray booth treating agent for removing paint suspended in washing water comprising 40 to 99.8% by weight of a melamine—aldehyde acid colloid solution, 0.1 to 30% by weight of a nitrogen atom-containing organic compound and 0.1 to 30% by weight of an anionic water soluble high molecular weight dispersant having molecular weight from 300 to 500,000, said nitrogen atom-containing organic compound being ethylenediamine tetraacetic acid, nitrilotriacetic acid or a salt thereof.

2. A treating agent as defined in claim 1, wherein the anionic water soluble high molecular weight dispersant is a homopolymer, copolymer, terpolymer containing acrylamide monomer partially hydrolyzed or a salt of said polymer.

3. A treating agent as defined in claim 1, wherein the melamine—aldehyde acid colloid solution comprises methylol melamine in which 1 to 6 mols of aldehyde is bonded to 1 mol of melamine, and an acid.

4. A treating agent as defined in claim 3, wherein the melamine—aldehyde acid colloid solution comprises an alkyl-etherfied methylol melamine prepared by further alkyl-etherifying methylol melamine in which melamine and aldehyde are bonded, and an acid.

5. A treating agent as defined in claim 3, wherein the acid is hydrochloric acid.

6. A treating agent as defined in claim 5, wherein the hydrochloric acid is added by from 0.5 to 1.5 mols based on 1 mol of melamine.

7. A treating agent as defined in claim 3, wherein the aldehyde is formaldehyde or paraformaldehyde.

8. A wet spray booth treating agent for removing paint suspended in washing water comprising 40 to 99.8% by weight of a melamine—aldehyde acid colloid solution, 0.1 to 30% by weight of a nitrogen atom-containing organic compound and 0.1 to 30% by weight of an anionic water soluble high molecular weight dispersant having molecular weight from 300 to 500,000, said anionic water soluble high molecular weight dispersant being a homopolymer, copolymer, terpolymer containing carboxylic acid monomers, or a salt of said polymer, the polymer containing the carboxylic acid monomer being a maleic acid type polymer with a molecular weight greater than 500 and small than 1,000.

9. A method for treatment of a wet paint spray booth comprising adding 40 to 99.8% by weight of a melamine—aldehyde acid colloid solution, 0.1 to 30% by weight of a nitrogen atom-containing organic compound and 0.1 to 30% by weight of an anionic water soluble high molecular weight dispersant having molecular weight from 300 to 500,000 to a recirculating washing water for the wet paint spray booth and containing more than 200 ppm paint, said nitrogen atom-containing organic compound being ethylenediamine tetraacetic acid, nitrilotriacetic acid or or salt thereof, addition amounts of said melamine—aldehyde acid colloid solution, said nitrogen atom-containing organic compound and said anionic water soluble high molecular weight dispersant to the washing water being from 1 to 1,000 ppm, from 0.01 to 20 ppm and from 0.01 to 20 ppm, respectively, said high molecular weight dispersant, when added in the washing water, making the paint into flowable paint particles and promoting reduction of tackiness of the paint particles, said high molecular weight dispersant and said nitrogen atom-containing organic compound reacting together to facilitate adsorption of melamine—aldehyde acid colloid solution to the paint particles to thereby reduce tackiness of the paint particles suspended in the washing water and to easily remove the paint particles from the washing water.

10. A method as defined in claim 9, wherein the addition amount of the melamine—aldehyde acid colloid solution based on the amount of the surplus paint in the recirculating washing water is from 1 to 100% by weight.

11. A method as defined in claim 9, wherein the addition amount of the hydrogen atom-containing organic compound based on the amount of the surplus paint in the cleaning water is from 0.01 to 5% by weight.

12. A method as defined in claim 9, wherein the addition amount of the anionic water soluble high molecular weight dispersant based on the amount of the surplus paint in the cleaning water is from 0.01 to 5% by weight.

* * * * *